United States Patent
Reis et al.

[19]

[11] Patent Number: 6,049,970
[45] Date of Patent: *Apr. 18, 2000

[54] Z-FIBER PINNING TOOL

[75] Inventors: Carl Andrew Reis; Doris Andren Reis, both of Torrance, Calif.

[73] Assignee: Northrop Grumman Corporation, Los Angeles, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/060,942

[22] Filed: Apr. 15, 1998

[51] Int. Cl.$^7$ .................................................. B23P 19/00
[52] U.S. Cl. ............................... 29/798; 492/13; 492/19; 492/27; 492/30; 428/119
[58] Field of Search .............................. 29/235, 432, 798, 29/451; 227/119, 142; 428/119; 492/13, 16, 27, 28, 30, 19

[56] References Cited

U.S. PATENT DOCUMENTS

| | | |
|---|---|---|
| D. 31,965 | 12/1899 | Arnett . |
| 471,115 | 3/1892 | Hawksley . |
| 752,454 | 2/1904 | Hovland . |
| 775,089 | 11/1904 | McClenahan . |
| 1,510,034 | 9/1924 | Brader . |
| 1,657,979 | 1/1928 | Thomas . |
| 1,897,088 | 2/1933 | Victor . |
| 2,329,438 | 9/1943 | Fiedler, Jr. ................................ 18/3.5 |
| 3,157,135 | 11/1964 | Fetrow et al. ............................. 107/50 |
| 3,159,905 | 12/1964 | Baggett, Jr. ................................ 29/110 |
| 3,439,406 | 4/1969 | Wallin . |
| 3,540,104 | 11/1970 | Duffy ..................................... 29/110.5 |
| 3,611,528 | 10/1971 | Lance . |
| 3,717,899 | 2/1973 | Gardner et al. . |
| 3,761,992 | 10/1973 | Schneller .................................. 15/210 |
| 3,821,828 | 7/1974 | Pearson ..................................... 15/104 |
| 3,846,060 | 11/1974 | Otis ......................................... 425/458 |
| 4,197,624 | 4/1980 | Lass . |
| 4,335,483 | 6/1982 | Buck .................................... 15/230.11 |
| 4,409,772 | 10/1983 | Boyack . |
| 4,426,760 | 1/1984 | Watts . |
| 4,451,223 | 5/1984 | Mower et al. .......................... 425/458 |
| 4,471,526 | 9/1984 | Zaltsberg . |
| 4,742,597 | 5/1988 | LaFlamme ............................. 15/244.2 |
| 5,393,289 | 2/1995 | Green ....................................... 492/13 |
| 5,466,506 | 11/1995 | Freitas et al. . |
| 5,556,565 | 9/1996 | Kirkwood et al. . |
| 5,566,866 | 10/1996 | Jacobsen et al. ....................... 222/495 |
| 5,736,222 | 4/1998 | Childress . |
| 5,789,061 | 8/1998 | Campbell et al. . |
| 5,827,383 | 10/1998 | Campbell et al. . |

*Primary Examiner*—David P. Bryant
*Attorney, Agent, or Firm*—Terry J. Anderson; Karl J. Hoch, Jr.

[57] ABSTRACT

The present invention is embodied in an tool and method for structurally applying fiber stiffeners to a material. The tool inserts a plurality of fibers embedded in a transfer material through a hat stiffener and into a substrate and includes a first head, a second head, and a handle. The first head is defined by a roller having first edges and a center cutout. The cutout corresponds to the thickness of the transfer material. The second head is located at a distal end from the first head and is defined by a roller having second edges and a center groove. The groove corresponds to a thickness associated with guiding the tool along the corner of the hat stiffener. The first and second edges conform to the surface of the substrate. The center handle is coupled between the first head and second head for gripping. The first head is adapted to initially drive the fibers embedded in the transfer material through the hat stiffener and into the substrate. The second head is adapted to finally secure the fibers within the hat stiffener and the substrate.

16 Claims, 3 Drawing Sheets

Z-FIBER PINNING TOOL

BACKGROUND OF THE INVENTION

1. Field of the Invention

The present invention relates in general to fiber pinning tools and in particular to a fiber pinning tool for structurally applying fiber stiffeners to a material.

2. Related Art

Many structural composites, such as structural composite airframes, usually consist of multiple stiffeners. The stiffeners supply rigidity and stiffness that is required under certain flight load conditions. One typical stiffener is a mechanical fastener, such as a hat stiffener. Hat stiffeners, named for their shape, are typically applied to aerospace structural composite components via their skin.

One process for fabricating hat stiffeners is to co-cure the hat to the skin of the structural composite material concurrently with the curing of the structural composite material itself. Another process for fabricating hat stiffeners is to secondarily mechanically bolt and/or adhesively bond the stiffener to the skin. However, in either case, the failure mode for both processes occurs at the inner hat to skin surface.

In order to resolve this problem, z-pinning is used. Z-pinning refers to applying reinforcing fibers in the same direction (or at a canted angle, such as 45°) that the composite fibers of the structural composite material reside in. In contrast, the X and Y direction is in-plane with the fibers of the structural composite material. The stiffeners are usually pinned in the Z-direction to the skin with large pinning fibers, such as boron fibers. The pinning fibers are typically imbedded in a material, such as Teflon. This technique has been found to increase the mechanical properties of the stiffener to skin interface.

In one method (hereinafter referred to as "multiple fiber pressing"), the Z-pinning process typically consists of first softening the composite stiffener and skin with heat and then driving plural fibers through the skin using a press. Since numerous fibers are forced into the skin at once, pressure needed to insert the plural fibers covering large areas at once must be done hydraulically. In another method (hereinafter referred to as "individual fiber insertion"), the Z-pinning process typically consists of forcing individual fibers through the skin one at a time. The fibers are forced into the skin with an ultrasonic device, which uses high frequency for vibrating the fiber and eventually forcing it into the skin.

Both processes are lacking. For instance, the multiple fiber pressing method is very costly and expensive since custom tooling for the press is required to match and properly interface the specific pinning fibers with the composite material. In addition, it would be impossible to z-pin fibers in a 45° angle at the inner hat to skin interface with this process. The individual fiber insertion method is very time consuming, tedious, requires many man hours (approximately 2 hours per in$^2$ of inserted fibers), and is not suitable for a production process. As such, these pressing methods are inefficient and not ideal for large scale components and manufacturing tooling.

Therefore, what is needed is a fiber pinning tool for efficiently structurally applying fiber stiffeners to a material. What is also needed is an inexpensive process for efficiently applying fiber stiffeners to a material. Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in an apparatus and method for structurally applying fiber stiffeners to a material.

Specifically, the present invention is embodied in a tool for inserting a plurality of fibers embedded in a transfer material through a hat stiffener and into a substrate. For inserting the fibers into an angled corner, the tool includes a first head, a second head, and a handle. The first head is defined by a roller having first beveled edges and a center cutout. The first beveled edges conform to the angled corner of the hat stiffener and the cutout corresponds to the thickness of the transfer material.

The second head is located at a distal end from the first head and is defined by a roller having second beveled edges and a center groove. The second beveled edges conform to the angled corner of the hat stiffener and the groove corresponds to a thickness associated with guiding the tool along the corner of the hat stiffener. The center handle is coupled between the first head and second head for gripping. The first head is adapted to initially drive the fibers embedded in the transfer material through the hat stiffener and into the substrate. The second head is adapted to finally secure the fibers within the hat stiffener and the substrate. For inserting the fibers into a flat surface, all of the beveled edges are flat edges or is a shim guide.

One feature of the present invention is the dual roller for driving and securing a plurality of fibers into a substrate. One advantage of the present invention is that the insertion of fibers can be accomplished efficiently and inexpensively.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
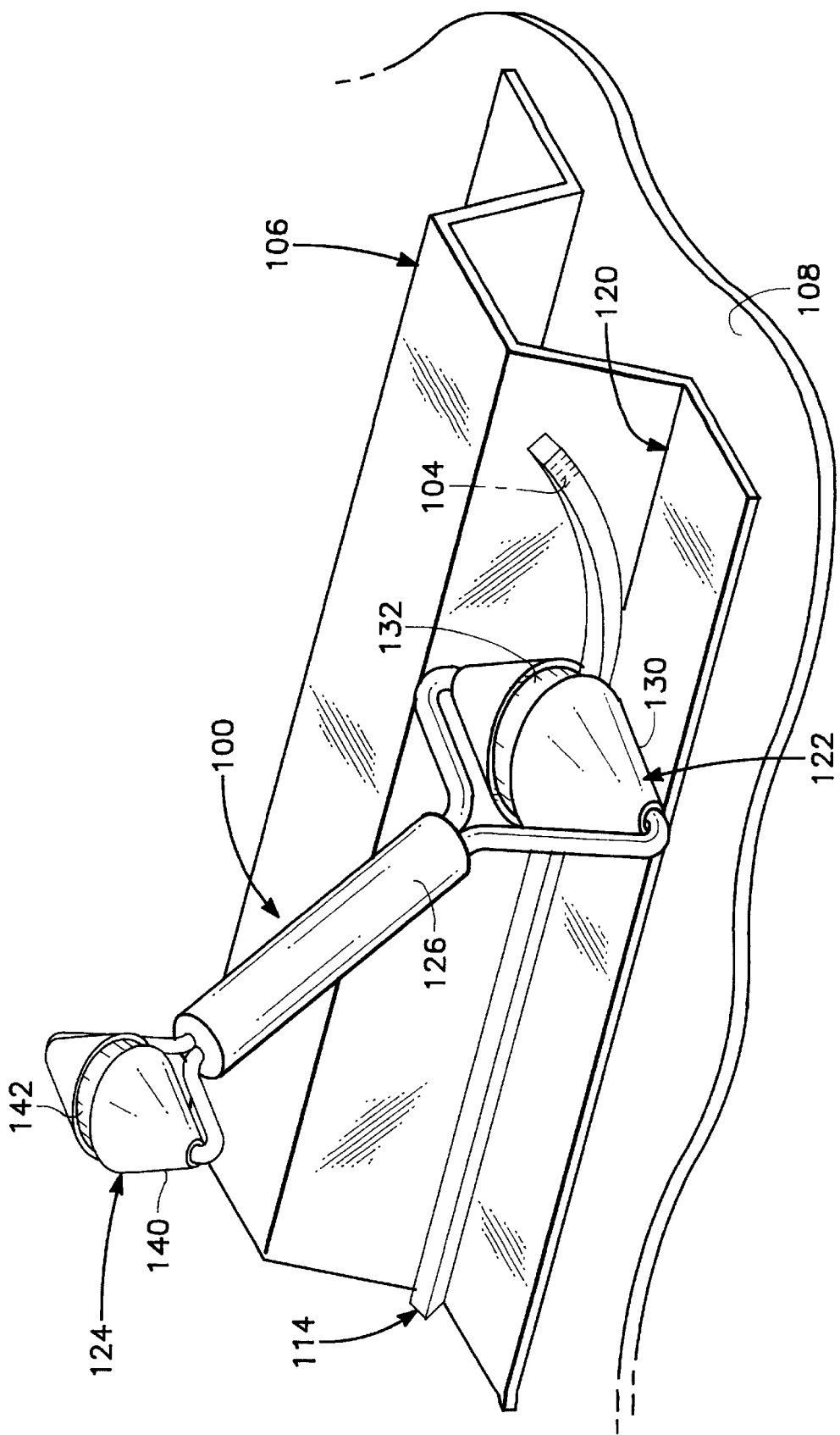
FIG. 1 is a perspective view of a tool of the present invention for angled insertion of fibers through a stiffener and into a substrate.

Overview:

FIG. 1 is a perspective view of a tool of the present invention for insertion of fibers through a stiffener and into a substrate. The tool 100 of the present invention is for structurally inserting fibers 104 through a stiffener 106 and into a substrate 108. The stiffener 106 is preferably a mechanical fastener, such as a hat stiffener, but can be any suitable stiffener for providing required rigidity and stiffness to the substrate 108 under certain load conditions. The substrate 108 is preferably a composite substrate, such as a skin of an airframe. The fibers 104 can be any suitable fibers capable of adequately securing the stiffener to the substrate, such as commercially available boron fibers. The fibers 104 are typically embedded in a transfer material 114, such as Teflon, for allowing multiple insertion and easy transfer of the fibers.

Components:

Referring to FIG. 1, the tool of the present invention for angled insertion of fibers through a stiffener and into a substrate is shown. For inserting the fibers 104 into an angled corner 120 of the hat stiffener 106, the tool 100 includes a first head 122, a second head 124, and a handle 126. The first head 122 can be a roller having first beveled end portions or edges 130 and a center groove or cutout 132. The first beveled edges 130 conform to the angled corner 120 of the hat stiffener 106 and the center cutout 132 corresponds to the thickness of the transfer material 114.

The second head 124 is located at an opposite end from the first head 122 and can be a roller having second beveled end portions edges 140 and a center groove 142. The second beveled edges 140 conform to the angled corner 120 of the hat stiffener 106 and the center groove 142 corresponds to a thickness associated with guiding the tool 100 along the angled corner 120 of the hat stiffener 106. The center handle 126 is coupled between the first head 122 and the second head 124 for easy gripping by a user.

Figure 2:
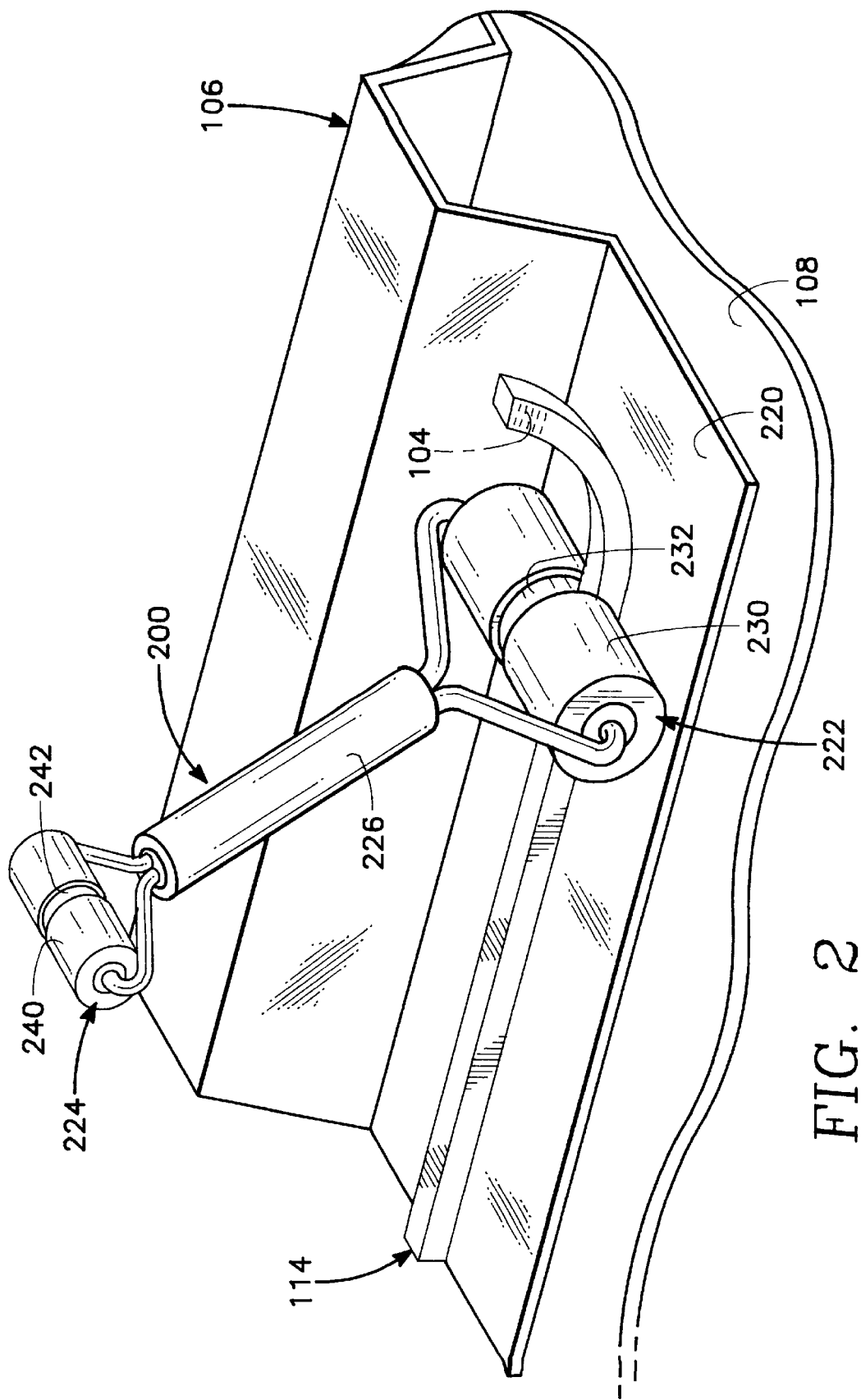
FIG. 2 is a perspective view of a tool of the present invention for flat insertion of fibers through a stiffener and into a substrate.

FIG. 2 is a perspective view of a tool of the present invention for flat insertion of fibers through a stiffener and into a substrate. For inserting the fibers 104 into a flat surface 220 of the hat stiffener 106, the tool 200 includes a first head 222, a second head 224, and a handle 226. The first head 222 can be a roller having first flat end portions or edges 230 and a center groove or cutout 232. The first flat edges 230 conform to the flat surface 220 of the hat stiffener 106 and the center cutout 232 corresponds to the thickness of the transfer material 114.

The second head 224 is located at an opposite end from the first head 222 and can be a roller having second flat end portions or edges 240 and a center groove 242. The second flat edges 240 conform to the flat surface 220 of the hat stiffener 106 and the center groove 242 corresponds to a thickness associated with guiding the tool 200 along the flat surface 220 of the hat stiffener 106. The center handle 226 is coupled between the first head 222 and the second head 224 for easy gripping by a user.

Figure 3:
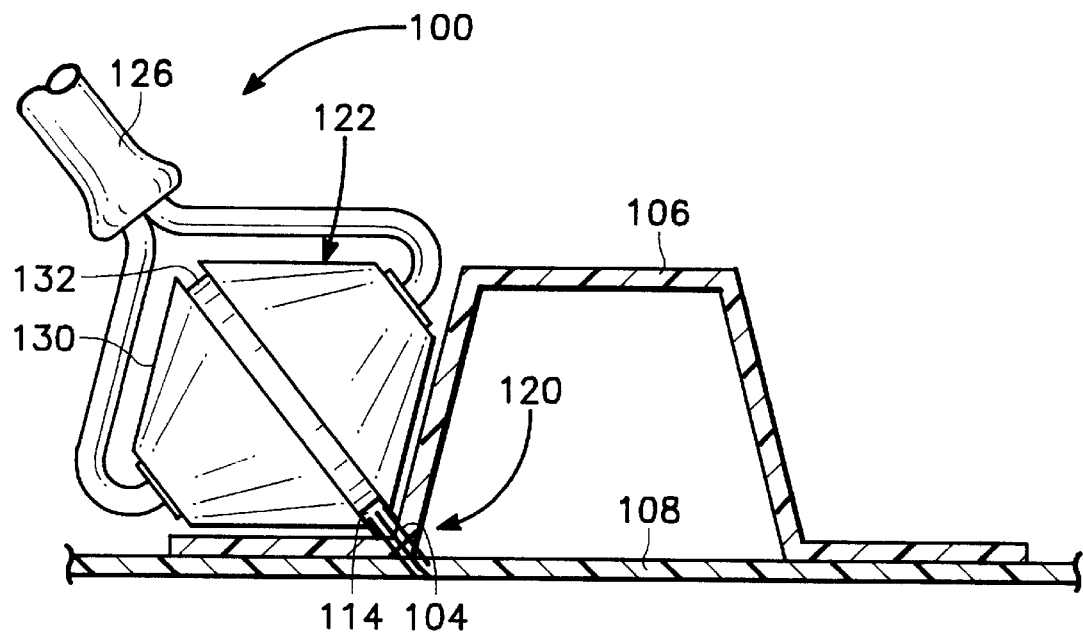
FIG. 3 is a partial cross-sectional view of the tool of FIG. 1.

Operation:

FIG. 3 is a partial cross-sectional view of the tool of FIG. 1. Referring to FIG. 1 along with FIG. 3, first, the transfer material 114 is located on the area of the stiffener 106 that the fibers 104 are to be inserted through. In the case of the hat stiffener 106 of FIG. 1, the fibers 104 are to be inserted through the area designated by the angled corner 120 and into substrate 108. Second, the first head 122 is placed over the transfer material 114 so that the transfer material 114 resides within the center cutout 132 of the first head 122.

Third, the handle 126 is gripped by a user and the tool 100 is traversed back and forth along the angled corner 120 several times until the fibers 104 are driven through the hat stiffener 106 and into the substrate 108 so that the transfer material 114 is flush with the hat stiffener 106. Fourth, the transfer material 114 is removed and the tool 100 is flipped so that the second head 124 is placed within the angled corner 120 so that the inserted fiber area resides below the center groove 142 of the second head 122. Next, the handle 126 is gripped by the user and the tool 100 is traversed back and forth along the angled corner 120 several times until the fibers 104 are secured within the hat stiffener 106 and the substrate 108. It should be noted that heat can be used to aid in inserting and securing the fibers 104 within the hat stiffener 106 and the substrate 108.

Figure 4:
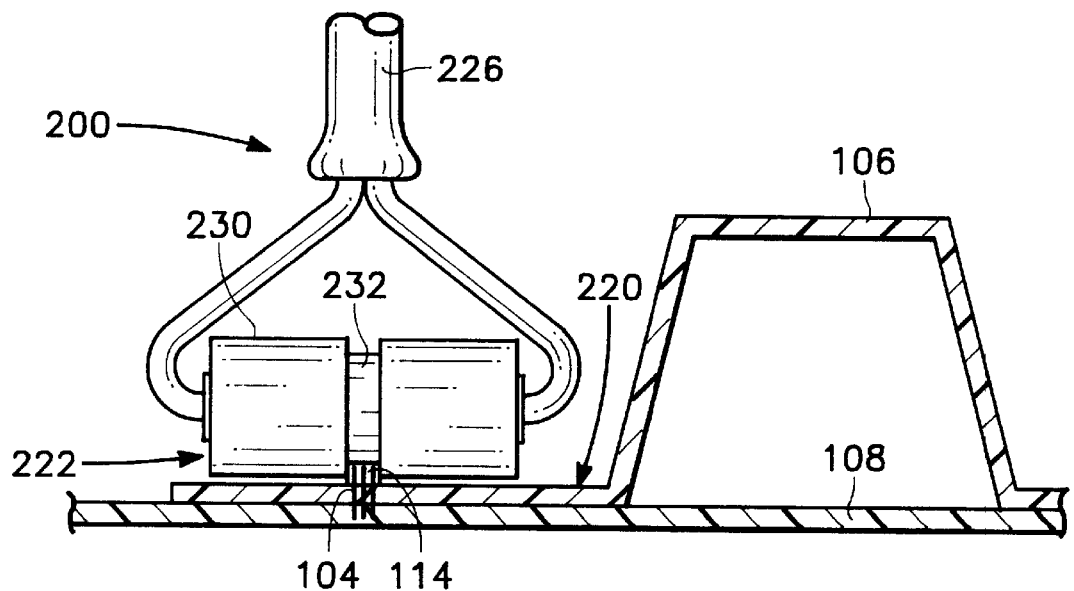
FIG. 4 is a partial cross-sectional view of the tool of FIG. 2.

FIG. 4 is a partial cross-sectional view of the tool of FIG. 2. Referring to FIG. 2 along with FIG. 4, first, the transfer material 114 is located on the area of the stiffener 106 that the fibers 104 are to be inserted through. In the case of the hat stiffener 106 of FIG. 2, the fibers 104 are to be inserted through the area designated by the flat surface 220 and into substrate 108. Second, the first head 222 is placed over the transfer material 114 so that the transfer material 114 resides within the center cutout 232 of the first head 222.

Third, the handle 226 is gripped by a user and the tool 200 is traversed back and forth along the flat surface 220 several times until the fibers 104 are driven through the hat stiffener 106 and into the substrate 108 so that the transfer material 114 is flush with the hat stiffener 106. Fourth, the transfer material 114 is removed and the tool 200 is flipped so that the second head 224 is placed on the flat surface 220 so that the inserted fiber area resides below the center groove 242 of the second head 222. Next, the handle 226 is gripped by the user and the tool 200 is traversed back and forth along the angled corner 220 several times until the fibers 104 are secured within the hat stiffener 106 and the substrate 108. It should be noted that heat can be used to aid in inserting and securing the fibers 104 within the hat stiffener 106 and the substrate 108.

In summary, the first head 122 of FIG. 1 and the first head 222 of FIG. 2 are adapted to initially insert the fibers 104 embedded in the transfer material 114 through respective areas 120, 220 of the hat stiffener 106, and into the substrate 108. In contrast, the second head 124 of FIG. 1 and the second head 224 of FIG. 2 are adapted to finally secure the fibers 104 within respective areas 120, 220 of the hat stiffener 106 and the substrate 108. This z-pinning action increases the mechanical strength of the stiffener. Also, the tools 100, 200 are easily manually operated, which significantly eliminates expensive tooling required for automatic presses, while allowing manually guided placement of the fibers for improved fiber insertion accuracy. Further, the fiber volume can be easily increased through reapplication of fibers in the stiffener.

The foregoing description of the preferred embodiment of the invention has been presented for the purposes of illustration and description. Additional z-pinning applications, such as z-pinning fibers directly into substrates can be performed with the tool of the present invention. As such, the specification is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for facilitating the insertion of multiplicity of pinning fibers through a stiffener member and into a substrate to secure the stiffener member to the substrate, the system comprising:

a transfer material which is of a particular width and thickness and includes the pinning fibers embedded therein; and a Z-pinning tool comprising:

a handle having opposed first and second ends;

a first head rotatably connected to the first end of the handle and including first end portions which are separated by an annular first groove having a width which exceeds the width of the transfer material, the first head being adapted to facilitate the proper location of the pinning fibers within the stiffener member when passed over the transfer material; and a second head rotatably connected to the second end of the handle and including second end portions which are separated by an annular second groove having a depth which is less than the depth of the first groove, the second head being adapted to facilitate the insertion of the pinning fibers into the substrate when passed thereover.

2. The tool of claim 1 wherein the first end portions of the first head and the second end portions of the second head each define a generally cylindrical outer surface.

3. The tool of claim 2 wherein:

the diameters of the outer surfaces of the first end portions of the first head are substantially equal to each other; and the diameters of the outer surfaces of the second end portions of the second head are substantially equal to each other.

4. The tool of claim 3 wherein the diameters of the outer surfaces of the first end portions of the first head exceed the diameters of the outer surfaces of the second end portions of the second head.

5. The tool of claim 1 wherein:

the first end portions of the first head are of substantially equal lengths; and the second end portions of the second head are of substantially equal lengths.

6. The tool of claim 5 wherein the widths of the first end portions of the first head exceed the widths of the second end portions of the second head.

7. The tool of claim 1 wherein the first end portions of the first head and the second end portions of the second head each define a beveled outer surface.

8. The tool of claim 7 wherein the outer surfaces of the first end portions of the first head and the second end portions of the second end are each of a gradually decreasing diameter as they extend away from respective ones of the first and second grooves.

9. A Z-pinning tool for use with a transfer material which is of a particular width and thickness and includes a multiplicity of pinning fibers embedded therein, the Z-pinning tool being operative to facilitate the insertion of the pinning fibers through a stiffener member and into a substrate to secure the stiffener member to the substrate and comprising:

a handle having opposed first and second ends;

a first head rotatably connected to the first end of the handle and including first end portions which are separated by an annular first groove having a width which exceeds the width of the transfer material and a depth which is less than the thickness of the transfer material, the first head being adapted to facilitate the proper location of the pinning fibers within the stiffener member when passed over the transfer material; and a second head rotatably connected to the second end of the handle and including second end portions which are separated by an annular second groove having a depth which is less than the depth of the first groove, the second head being adapted to facilitate the insertion of the pinning fibers into the substrate when passed thereover.

10. The tool of claim 9 wherein the first end portions of the first head and the second end portions of the second head each define a generally cylindrical outer surface.

11. The tool of claim 10 wherein:

the diameters of the outer surfaces of the first end portions of the first head are substantially equal to each other; and the diameters of the outer surfaces of the second end portions of the second head are substantially equal to each other.

12. The tool of claim 1 wherein the diameters of the outer surfaces of the first end portions of the first head exceed the diameters of the outer surfaces of the second end portions of the second head.

13. The tool of claim 9 wherein:

the first end portions of the first head are of substantially equal lengths; and the second end portions of the second head are of substantially equal lengths.

14. The tool of claim 13 wherein the widths of the first end portions of the first head exceed the widths of the second end portions of the second head.

15. The tool of claim 9 wherein the first end portions of the second head each define a beveled outer surface.

16. The tool of claim 15 wherein the outer surfaces of the first end portions of the first head and the second end portions of the second are each of a gradually decreasing diameter as they extend away from the respective ones of the first and second grooves.

* * * * *